Patented Sept. 29, 1925.

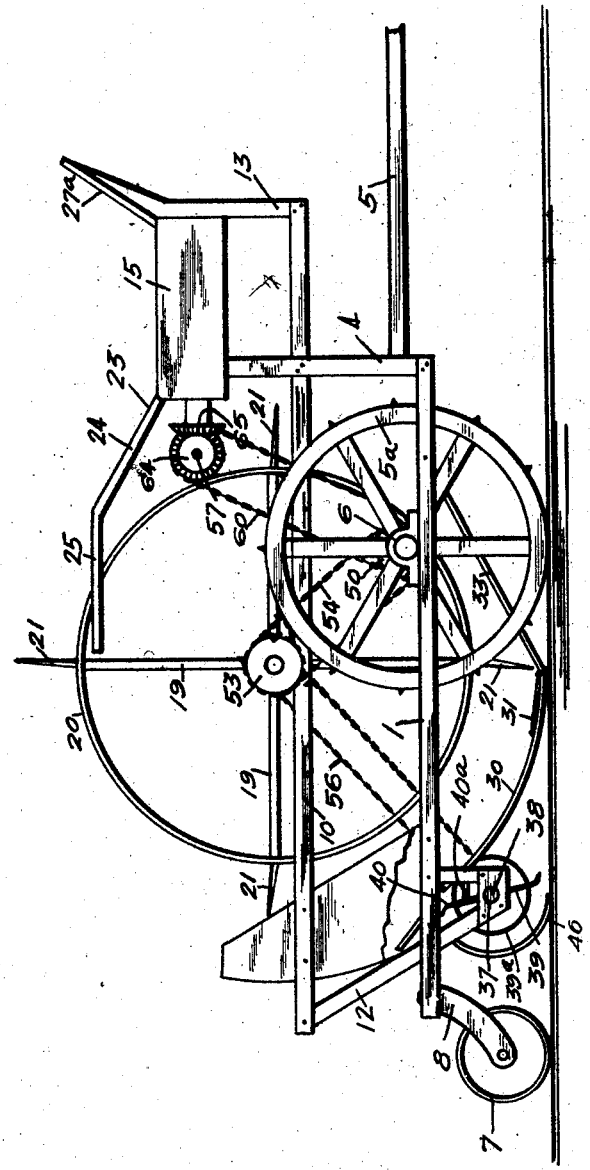

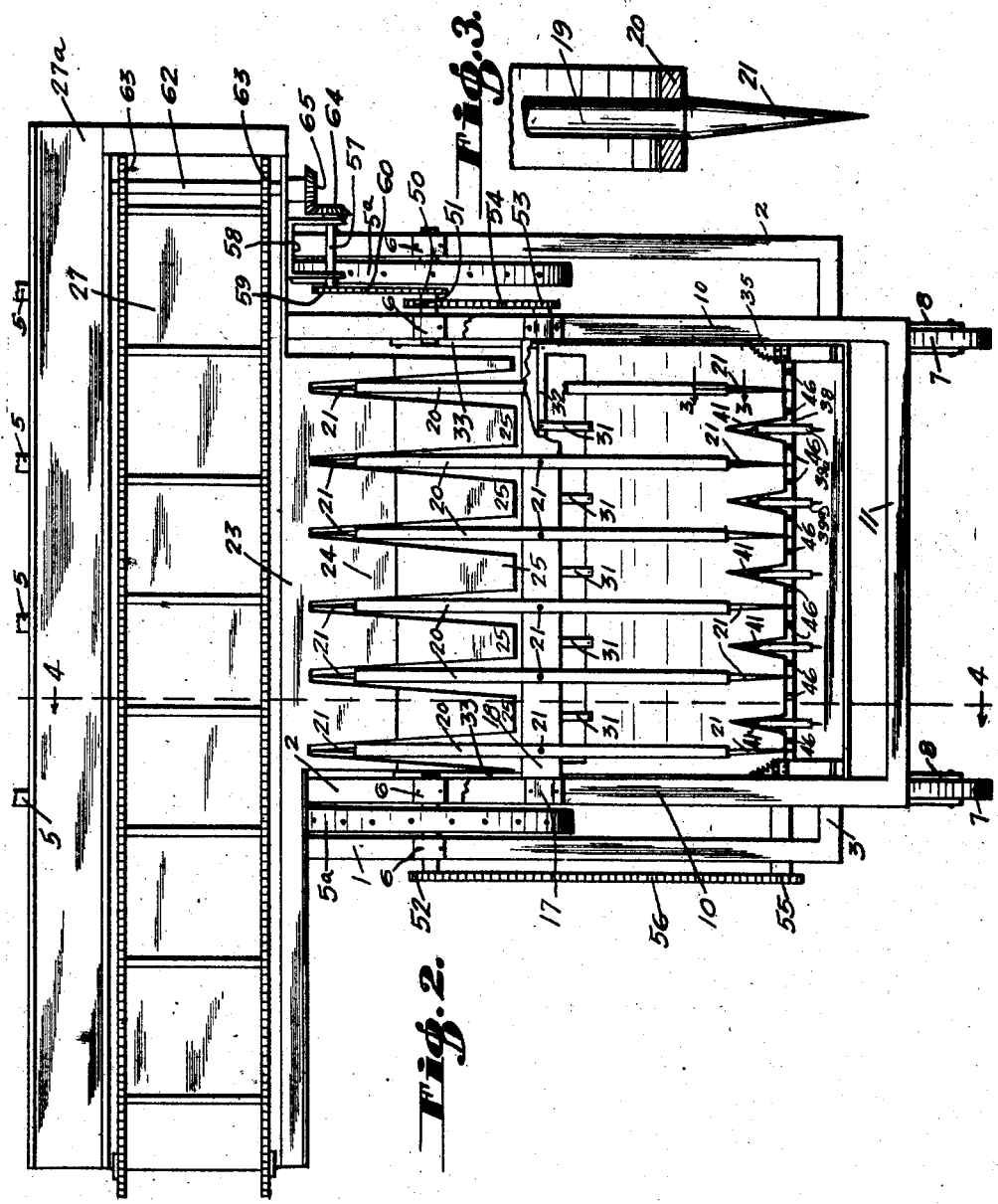

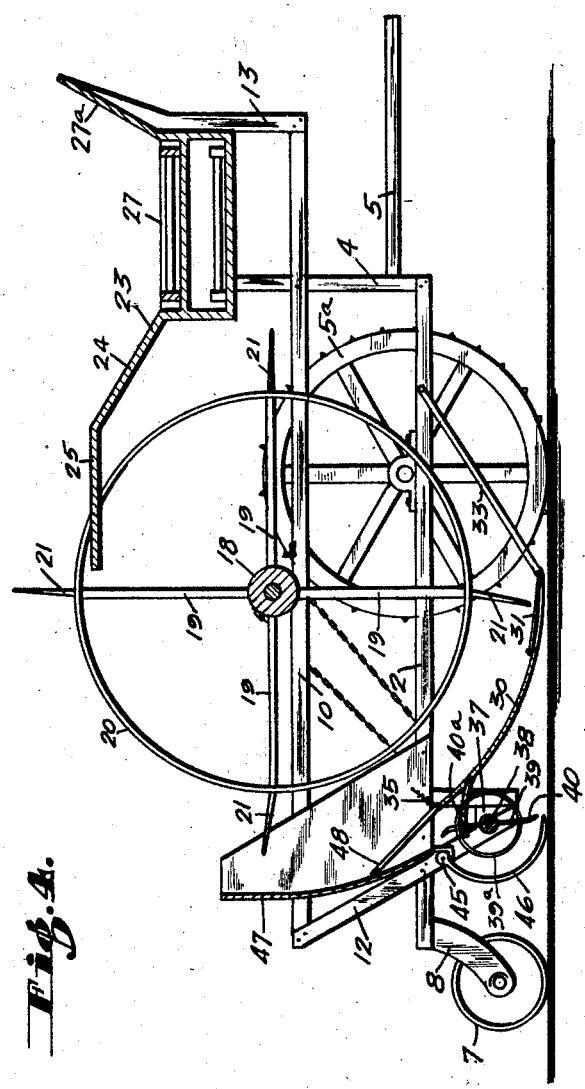

1,555,099

UNITED STATES PATENT OFFICE.

BERT C. BERRY, OF LONG BEACH, CALIFORNIA.

LOADER FOR SHEAVES OR BUNDLES.

Application filed March 2, 1921. Serial No. 449,246.

*To all whom it may concern:*

Be it known that I, BERT C. BERRY, a citizen of the United States, residing at Long Beach, in the county of Los Angeles and State of California, have invented new and useful Improvements in Loaders for Sheaves or Bundles, of which the following is a specification.

It is the object of this invention to provide a loader for sheaves or bundles of grain, hay, and the like which forms a practical and efficient structure adapted to load sheaves or the like and also arranged to lift all of the hay or grain including the gleanings.

The improved structure includes a vehicle frame having a rotatable member provided with projecting prongs, and of such size that the prongs will be swung upwardly from a position close to the ground to a position from which the sheaves carried by the prongs may be lifted onto a conveyor, positioned at such a height as to load the sheaves from the same into a suitable vehicle not shown, through the medium of a horizontally moving conveyor flight.

The improved loader also includes a pan or the like positioned to move along the ground so as to gather the sheaves upon the pan for subsequent engagement thereof by the prongs of the rotatable elevating member. This pan is supported for automatic adjustment relative to the ground so as to provide for inequalities in the surface of the ground.

The improved mechanism also includes elevating means arranged in rear of the pan structure and adapted to gather all the gleanings so as to elevate the same into the path of the prongs of the rotating elevating mechanism in order that the sheaves, as well as the gleanings from the same, may be loaded into a vehicle.

It is a still further object of the invention to provide means whereby the elevated material may be lifted from the prongs of the rotatable elevating mechanism onto an endless conveyor without pinching or otherwise impeding the movement of the material to the conveyor.

The invention will be readily understood from the following description of the accompanying drawings, in which Figure 1 is a side elevation of the invention, constructed in accordance with the invention, partly broken away.

Fig. 2 is a plan view of the invention also partly broken away.

Fig. 3 is a detail section on the line 3—3 of Fig. 2.

Fig. 4 is a vertical section on the line 4—4 of Fig. 2.

The improved loader includes a main frame having on each side a pair of spaced side bars 1 and 2 connected by a rear cross bar 3 and formed with supports 4 at the front ends of the side bars. Draft mechanism shown as shafts 5 extend forwardly from the vehicle frame. Vehicle wheels $5^a$ are mounted between the respective pairs of side bars 1—2, as in bearings 6, said wheels being positioned adjacent the forward end of the vehicle frame. The rear end of the frame is supported by wheels 7 shown as swivel wheels connected to the main frame by brackets 8.

An auxiliary frame including side bars 10, and a rear cross bar 11 is mounted above the vehicle frame and may be carried by support 4 at the front end thereof, and by supports 12 at the rear end of said auxiliary frame and connected to the side bars of the main frame. The side bars 10 are preferably extended forwardly beyond supports 4 with supports 13 extending upwardly from the front ends thereof, and a suitable conveyor frame 15 is carried by supports 4 and 13 in a position transversely of the vehicle frame and at such an elevation that sheaves may be dropped from a conveyor in said conveyor frame into a vehicle which is to be loaded and which is alongside the loading mechanism.

Bearings 17 are provided upon the side bars 10 of the auxiliary frame with a hub 18 journaled in said bearings and extending across the loader. Spokes 19 extend from hub 18, and said spokes are arranged in sets spaced along the length of hub 18. Circular decks 20 are fixed upon the respective sets of spokes with the ends of the latter projecting beyond said decks and preferably tapered to points so as to form prongs 21. The decks and projecting prongs are of such size that when hub 18 is rotated, the ends of the prongs will be spaced slightly from the ground during the lower portion of the rotation of the device, and said prongs will be above the conveyor frame 15 during the upper portion of their rotatable movement.

An apron 23 extends rearwardly from conveyor frame 15 in alinement with the rotatable elevating decks, and fastened to apron 23 are a series of stationary decks 24 extending rearwardly between revolving decks 20. All materials elevated by decks 20 are lifted from the same by the portions 25 of stationary decks 24 which extend between the revolving decks, and the material is swept by tines 21 down the decks 24 which are inclined downwardly toward the conveyor frame.

A usual endless conveyor 27 is arranged in frame 15 so as to receive material from apron 23 and convey the same transversely of the loader. An apron 27$^a$ preferably extends upwardly and forwardly at the front of conveyor frame 15 and above the endless conveyor so as to guide the material carried by the endless conveyor during its movement along the same. The conveyor and its frame are preferably horizontally positioned and extend an appreciable distance beyond one side of the frame of the device in order that material may be dropped from the endless conveyor into a vehicle, or the like, beneath its projecting end.

A pan 30 is positioned beneath the rotatable elevating mechanism with the forward edge of said pan preferably provided with bars 31 extending beyond the same. The forward ends of these bars are connected by cross rod 32, and arms 33 are pivoted to the latter. These arms are in turn pivoted to side bars 2 of the main frame in order that the forward end of pan 30 will be movably supported beneath the elevating mechanism and in engagement with the ground so as to readily yield to the inequalities in the surface of the ground. As will be clearly seen by reference to Fig. 1, the forward end of pan 30 is positioned beneath prongs 21 when the latter are at the lowest point in their rotation, and as a consequence the material swept onto the pan will be engaged by the prongs as the elevating mechanism rotates.

Pan 30 is inclined upwardly toward its rear end, and said pan preferably terminates below the main frame of the vehicle with the rear end of the pan yieldably supported by the main frame. The yieldable support may comprise springs 35 connected to the side edges of the pan and to the side bars 2 of the vehicle frame.

Bearings 37 depend from side bars 2, and a shaft 38 is journaled in these bearings beneath the rear end of pan 30. Spokes 39 project from shaft 38 in sets spaced along the length of the shaft, and circular decks 39$^a$ are mounted upon the respective sets of spokes, and the ends of the spokes projecting beyond the decks 39$^a$ are formed as curved raking teeth 40 adapted to swing close to the ground as shaft 38 is rotated, in order to elevate the gleanings which have not been gathered onto pan 30, or which have dropped from the loader.

The rear end of pan 30 which is in alinement with spokes 39 is preferably downwardly curved as shown at 40$^a$ and is slotted as shown at 41 in order to receive the spokes 39 and decks 39$^a$ during the upper portion of their rotation.

A rod 45 extends across the main frame of the loader in rear of the elevating mechanism carried by shaft 38 and at the upper portion of the same, and curved rake teeth 46 depend from this cross rod into engagement with the ground so as to gather gleanings and like material which escape pan 30. The parts are so positioned that the material gathered by rakes 46 will be engaged by the rotating rake teeth 40 in order to elevate such material and deposit the same upon the inclined rear end of pan 30 from whence such material will drop into the main pan so as to be engaged by the prongs 21.

An auxiliary pan 47 extends upwardly from the main frame of the machine in rear of the main elevating mechanism and at the respective sides of prongs 21. This pan is adapted to guide the movement of the material being lifted by prongs 21 until the material has been elevated above the horizontal axis of the rotatable elevating means and to a position where the material will be sufficiently held by means of decks 20 and prongs 21. In order to guide the movable pan 30 as it swings up and down through inequalities in the surface of the ground, arms 48 preferably extend rearwardly beyond the respective sides of the pan and rest against the base of pan 47 for free sliding movement along said base.

The main elevating mechanism and the auxiliary elevating mechanism for gleanings are rotated in the same direction as the traction wheels 5$^a$ of the device, and the endless conveyor carried in frame 15 is operated by the rotation of the traction wheels. As an instance of this arrangement sprocket wheels 50 and 51 are fixed upon the axle of one of the wheels 5$^a$, and a sprocket wheel 52 is fixed upon the axle of the other traction wheel. A sprocket wheel 53 is fixed upon the hub 18 and a sprocket chain 54 cooperates with wheels 51—53 for rotating the main elevating mechanism. In similar manner a sprocket wheel 55 is fixed upon shaft 38, and a sprocket chain 56 co-operates with wheels 52—55 for rotating the auxiliary elevating mechanism.

A shaft 57 is journaled in a bracket 58 upon conveyor frame 15, and said shaft is provided with a sprocket wheel 59 so as to rotate said shaft by a sprocket chain 60 co-operating with wheels 50—59. One of the shafts 62 carrying sprockets 63 over which the endless conveyor moves forms a drive shaft for the endless conveyor and is rotated by shaft 57. For this purpose co-operating bevel pinions 64 and 65 are provided upon shafts 57 and 62 respectively.

In operation it will be understood that sheaves or other material upon the ground will be swept onto pan 30 which, through its movable support will always be maintained in engagement with the ground, and the prongs of the rotating elevating mechanism will engage the material upon pan 30 so as to lift the same. Any gleanings of the material which escape pan 30 will be engaged by the rakes 46, and the prongs of the auxiliary elevating mechanism will lift such gleanings in similar manner. As teeth 40 pass beyond the upper portion of their rotatable movement, the material carried thereby will be lifted by the end of pan 30 onto the latter, and will be deposited in the path of rotating prongs 21, so that all the material from a field will be elevated by these latter prongs. As prongs 21 pass beyond the portions 25 of decks 24, the material carried thereby will be lifted onto the stationary decks, and will then move down the inclined decks 24 to the endless conveyor. It will be noted that the provision of inclined decks 24 makes possible the lifting of the material from prongs 21 without a pinching action, and as a consequence the material will readily pass to the endless conveyor. When the material has been moved along the endless conveyor to the end thereof projecting laterally beyond the latter, it will be dropped from the same to a suitable vehicle, or the like, which is drawn alongside of the loading mechanism.

Various changes may be made without departing from the spirit of the invention as claimed.

What is claimed is:

1. A loading mechanism including a vehicle frame, elevating means carried by said frame arranged to engage material to be lifted, and an auxiliary elevating device in rear of the elevating means adapted to engage material escaping said means for lifting the same to said means.

2. A loading mechanism including a pan beneath said frame and having a swinging supporting means at its forward end connected to said frame, yieldable supporting means at the rear end of said pan connected to said frame, a fixed guideway extending above said pan, elevating means co-operating with said pan and guideway to lift material, and guide members upon said pan engaging said guideway.

3. A loading mechanism including a vehicle frame, a pan beneath the same engaging the ground, elevating means co-operating with said pan to lift material, rake members in rear of and beneath said pan and in engagement with the ground, and elevating means co-operating with said rake members, said pan overlying the last mentioned elevating means and being slotted to receive the same so that material may be lifted from said elevating means into the pan.

4. In a loading mechanism, the combination of a vehicle frame, a pan beneath the vehicle frame, open at its forward end to receive material, and elevated at its rear end, rotating elevating means having prongs adapted to engage and lift the material contained in the pan, rake members in rear of and beneath said pan and in engagement with the ground, and rotating elevating means provided with prongs co-operating with said rake members, the portion of the pan overlying the last mentioned elevating means being slotted to permit passage of the last mentioned prongs to permit the latter to elevate the material into the path of travel of the prongs of the first mentioned elevating means.

5. A loading mechanism including a vehicle frame, wheels for supporting the vehicle frame, a pan beneath the vehicle frame open at its forward end and extending upwardly and rearwardly to elevate material, a rotating elevating means provided with prongs and located above and in front of the pan and having the prongs projecting into the pan to engage material therein, and supplementary elevating mechanism located behind and below the pan and adapted to elevate material into the path of travel of the prongs of the first mentioned elevating means, substantially as described.

In testimony whereof I have signed my name to this specification.

BERT C. BERRY.